United States Patent Office

3,403,138
Patented Sept. 24, 1968

3,403,138
POLYOLEFIN REACTION PRODUCTS
Douglas C. Edwards, Sarnia, Ontario, Canada, assignor to Polymer Corporation Limited, Sarnia, Ontario, Canada, a body corporate and politic of Canada
No Drawing. Filed Sept. 14, 1964, Ser. No. 396,418
Claims priority, application Canada, Sept. 18, 1963, 884,770
12 Claims. (Cl. 260—88.2)

ABSTRACT OF THE DISCLOSURE

Liquid polymers suitable for use in preparing caulking compounds, binders, cements, etc. which are vulcanizable at ambient temperatures with polyfunctional amines may be prepared by heating saturated, high molecular weight homo- or copolymers of isobutylene with a bromine-releasing agent at temperatures of at least 75° C. and preferably 110–150° C. until their viscosity average molecular weights are reduced at least 500% and preferably to a range of 5000–40,000.

---

This invention relates to polyolefin reaction products, and, in particular, to vulcanizable reaction products formed from substantially saturated iso-monoolefin polymers.

It is well known that butyl rubber, which term includes copolymers of isobutylene with a minor proportion of a diolefin such as, for example, isoprene or butadiene-1,3, may be brominated to yield products possessing certain advantages, including an increased rate of vulcanization and an improved capacity to covulcanize with other elastomers. Bromination of butyl rubber is facilitated by the presence of chemical unsaturation in the polymer and occurs without any marked reduction in molecular weight which would normally be considered undesirable.

It has now been found that when substantially saturated iso-monoolefin polymers are brominated under conditions specifically selected to promote a large degree of degradation, useful vulcanizable reaction products are obtained. By "substantially saturated iso-monoolefin polymers" in the specification and claims is meant iso-monoolefin polymers into which no chemical unsaturation has been purposely introduced during their manufacture. However, it is believed that a small amount of terminal unsaturation is inherently introduced when the iso-monoolefin is polymerized, such amount being less than 0.1 mole percent.

Accordingly, the present invention provides a vulcanizable reaction product formed from a substantially saturated iso-monoolefin polymer of high molecular weight and composed of chains of degraded polymer of which a major proportion possess terminal bromine atoms, said reaction product having a viscosity average molecular weight not greater than twenty percent that of the unbrominated polymer.

The invention also includes a process of producing a vulcanizable reaction product which comprises reacting a substantially saturated iso-monoolefin polymer of high molecular weight with a brominating agent at an elevated temperature, whereby a brominated reaction product is obtained composed of chains of degraded polymer of which a major proportion possess terminal bromine atoms, and having a viscosity average molecular weight not greater than twenty percent that of the unbrominated polymer.

The reaction products of the present invention can be conveniently cured by polyfunctional amines of which the most suitable are aliphatic amines containing mixed primary and secondary amine groups, such as triethylene tetramine and tetraethylene pentamine, and aliphatic difunctional primary amines, such as hexamethylene diamine. Of the specific compounds referred to, tetraethylene pentamine is preferred from a practical standpoint by virtue of being a low vapour pressure liquid possessing little odour together with the fact that it readily mixes with the reaction products, enables curing to be effected at a satisfactory rate and is inexpensive.

The uncured reaction products, which may range from pourable liquids to millable, semi-solid polymers, normally have viscosity average molecular weights of up to 150,000 and preferably between 5,000 and 40,000. The high molecular weight iso-monoolefin polymers from which these reaction products are prepared can have viscosity average molecular weights of up to ten million or more, although usually they are within the range of from 200,000 to five million. The viscosity average molecular weight (M) of a polymer is determined from the intrinsic viscosity ($\eta$) thereof using the equation of P. J. Flory, that is $\log M = 5.378 + 1.56 \log \eta$ (see Industrial Engineering Chemistry, 38, 417–36 (1946).

While a major proportion of the chains of the reaction products possess terminal bromine atoms, it is not essential that all the chain ends be so terminated or that the non-terminal portions of all chains be totally free of substituent bromine atoms. Generally speaking, however, the more chains having terminal bromine atoms the better and preferably at least 75 percent of all chains are substituted in this way.

The bromine content of the uncured reaction product can vary within quite wide limits, but is usually not less than 1 percent by weight and preferably between 2 and 15 percent.

While preferably the viscosity average molecular weight of the brominated reaction product falls within the range of from 0.3 to 10 percent that of the unbrominated polymer, the lower limit can be as little as 0.1 percent or even less.

Suitable iso-monoolefin polymers for use in the present invention are those prepared from iso-monoolefins containing from four to eight carbon atoms in the molecule and having a terminal methylene group. They include homopolymers of isobutylene and copolymers of isobutylene with other mono-olefins or with unsaturated aromatic hydrocarbons such as styrene and α-methyl styrene. The preferred polymers are the homopolymers of isobutylene which are usually prepared by ionic polymerization at low temperatures using a Friedel-Craft type catalyst such as boron trifluoride or aluminum chloride in the presence of an inert diluent which may be a non-solvent, for example, methyl chloride or a solvent, for example, hexane.

Typical brominating agents, in addition to bromine itself, include such bromine-releasing compounds as the N-bromo hydantoins and the N-bromo compounds of aliphatic carboxylic acid amides or imides. Examples of the hydantoins are N-N'-dibromo-5,5 dimethyl hydantoin and N-bromo-5-methyl-5-ethyl hydantoin, while examples of the acid amide or imide agents are N-bromoacetamide and N-bromosuccinimide.

The amount of brominating agent used is not critical but must be sufficient to give a suitably degraded iso-monoolefin polymer under the prevailing reaction conditions. In the case of bromine, the amount used is normally not less than 5 percent by weight of polymer and more usually ranges from 10 percent to 120 percent. However, when employing a bromine-releasing compound, the amount depends on the number of active bromine atoms per molecule of brominating agent, as well as on the type of iso-monoolefin used.

In carrying out the invention, the iso-monoolefin polymer may be conveniently reacted with bromine in solution in an organic solvent, such as carbon tetrachloride, or alternatively the polymer can be digested in a solvent therefor containing bromine. However, when a solid bromine-releasing compound is employed, it is usual to carry out the reaction while the polymer is in admixture therewith. Normally, the reaction is effected at a temperature of at least 75° C. and preferably between 110° and 150° C.

The reaction products of the present invention have the advantage that they can be readily "cold" cured, that is cured at the ambient temperature, usually 15–25° C., in the presence of a polyfunctional amine curing agent. Furthermore, the brominated reaction product may be mixed with oils, fillers or other compounding ingredients together with a curing agent so as to produce compounds vulcanizing at ambient or elevated temperatures.

The vulcanized reaction products exhibit a substantial degree of insolubility in organic solvents such as cyclohexane, and possess the properties of high extensibility and retraction typical of vulcanized elastomers. Desirably, the insolubility of a reaction product in cyclohexane at 25° C. is at least 50 percent by weight and preferably between 75 and 98 percent.

The vulcanizable reaction products of the present invention can be used as cements, mastics, sealants and rocket fuel binders. The "cold" curing reaction products have found particular applications as caulking materials since they give rise to stable and flexible products.

The invention will now be illustrated by the following examples.

Example I

Five grams of a saturated polyisbutylene having a viscosity average molecular weight of about 2,150,000 (intrinsic viscosity 4.1), were banded on a cold two-roll mill at a temperature of about 30° C. and 1 gram of dibromodimethyl hydantoin was uniformly blended into the polyisobutylene. In a similar manner, one gram of dibromodimethyl hydantoin was blended into each of two butyl rubbers, one having an intrinsic viscosity of 1.4 with a chemical unsaturation of 0.7 mole percent, the other having an intrinsic viscosity of 1.6 and a chemical unsaturation of 1.5 mole percent.

After blending, the three mixtures were placed in individual glass jars with loosely fitted screw caps and then transferred to an oven for 2 hours at 149° C.

The polyisobutylene blend gave rise to a fluid degraded polymer which was readily and completely soluble in toluene, while the butyl rubbers were converted to tough, elastic polymers which would only swell in toluene, remaining insolule even when shaken for 16 hours.

Example II

A solution was prepared by dissolving 100 grams of a saturated polyisobutylene having a viscosity average molecular weight of about 2,150,00 (intrinsic viscosity of 4.1), in 3,000 milliliters of carbon tetrachloride. Seven 80 mls. aliquots of this solution were each subjected to bromination at the temperatures stated below in Table I.

Each aliquot was placed in a glass pressure vessel, from which the air was evacuated, dry nitrogen was introduced to raise the pressure to atmospheric and 1 milliliter of bromine was added. The vessels were then heated to the required temperatures and the reaction was allowed to proceed for 60 minutes. The resulting solutions were allowed to cool to room temperature and the polymeric reaction products were recovered by precipitation with ethanol. After washing with ethanol and drying under vacuum at 80° C. for one hour, the bromine contents, intrinsic viscosities and vulcanizability of the reaction products were determined, the results being shown below in Table I.

Bromine content was determined by comparing the X-ray fluorescence of a solution of 0.5 gram of reaction product in 2.5 milliliters of benzene with solutions of polyisobutylene containing known amounts of dodecyl bromide.

Intrinsic viscosity was measured with a modified Ubbelohde viscometer using a solution of reaction product in dissobutylene at 20° C. The viscosity average molecular weights of the reaction products were then calculated using the Flory equation mentioned previously.

Vulcanizability was ascertained by mixing one gram of each reaction product with 0.1 ml. of hexamethylene diamine and placing the mixture on a glass plate in an oven for 16 hours at 80° C. One half grams of the resulting cured product was then placed in 50 mls. of cyclohexane for 48 hours at room temperature. By determining the swollen weight and the portion soluble, the cross-link density of the cured product was calculated according to the method of Bristow and Watson (Transactions of the Faraday Society, 54, 1731, 1958).

TABLE I

| Reaction temperature, ° C. | Reaction Product | | Vulcanizate | |
|---|---|---|---|---|
| | Bromine Content, Weight Percent | Viscosity Average Molecular Weight | Percent Insoluble | Cross-link Density (mole/cc.) |
| 83 | 2.4 | 28,000 | 79 | $0.12 \times 10^{-4}$ |
| 105 | 1.7 | 40,000 | 80 | $0.08 \times 10^{-4}$ |
| 115 | 2.7 | 21,000 | 95 | $0.82 \times 10^{-4}$ |
| 120 | 2.3 | 33,000 | 93 | $0.18 \times 10^{-4}$ |
| 130 | 2.0 | 35,000 | 94 | $0.24 \times 10^{-4}$ |
| 135 | 3.6 | 14,000 | 96 | $0.96 \times 10^{-4}$ |
| 139 | 5.1 | 10,000 | 98 | $2.0 \times 10^{-4}$ |

It can be seen that the high molecular weight polyisobutylene was degraded to form soluble polymeric reaction products of much lower molecular weight containing varying amounts of combined bromine. Unlike the parent polymer, these reaction products were vulcanizable with hexamethylene diamine to give a dimensionally stable and flexible material. The cross-link density compares favourably with the values of 0.05 to $1.0 \times 10^{-4}$ which are typical of conventional butyl rubber vulvanizates.

Example III

A carbon tetrachloride solution of a saturated polyisobutylene having a viscosity molecular weight of about 265,000 (intrinsic viscosity of 1.07) was prepared with a concentration of 10 grams of polymer per 100 milliliters of solution. 50 milliliter aliquots of the solution were placed in each of six heat-resistant glass tubes. Different amounts of bromine, as shown below in Table II, were introduced into various tubes and the supernatant air flushed out with a stream of dry nitrogen, prior to the tubes being sealed off by heat. The sealed tubes were then placed inside steel pipes which were capped and placed in an oven for the times and temperatures stated in Table II below. After removing, cooling and opening the tubes, the polymeric reaction products were recovered by precipitation with ethanol, followed by washing with ethanol, and vacuum drying at 80° C. for one hour. The bromine contents and viscosities of the reaction products were measured as described in Example II and the corresponding viscosity average molecular weights were calculated using the Flory equation, the results being set out in Table II.

TABLE II

| Bromine Added (grams) | Time Heated (hours) | Temp. of Oven (° C.) | Calculated Viscosity Average Molecular Weight | Bromine in Product (Weight Percent) |
|---|---|---|---|---|
| 0.5 | 2 | 130 | 109,000 | 1.9 |
| 1.0 | 2 | 130 | 17,100 | 3.0 |
| 1.5 | 2 | 130 | 10,800 | 6.3 |
| 2.0 | 2 | 130 | 9,800 | 8.1 |
| 1.0 | 4 | 110 | 21,300 | 2.9 |
| 1.0 | 1 | 185 | 16,200 | 2.8 |

The results show that polyisobutylene may be reacted at elevated temperatures with bromine to yield soluble polymeric reaction products of lower molecular weight than the original polyisobutylene and that time, temperature and bromine concentration are factors which control the rate of degradation. It will be observed that a temperature of the order of 130° C. gives rise to a suitable reaction rate.

Example IV

Into 1,000 grams of a saturated polyisobutylene having a viscosity average molecular weight of about 2,150,000 (intrinsic solution viscosity of 4.1) were milled 200 grams of powdered N-N'-dibromo-5,5 dimethylhydantoin on a cold two roll mill. The resulting uniform mixture was then heated in a loosely capped glass jar in an oven for 3 hours at 149° C.

The intrinsic viscosity and bromine content of the polymeric reatcion product were determined as described in Example II. The intrinsic viscosity of the reaction product was 0.28, corresponding to a reduction in viscoity average molecular weight down to about 32,000, while the bromine content was 3.6% by weight.

The uncured reaction product was heated with a petroleum oil to 120° C. and stirred to form a pourable viscous liquid. Different compounding ingredients were then incorporated into equal portions of the viscous liquid, followed by the addition of triethylene tetramine and titanium dioxide, which compounds had been pre-mixed to form a paste.

Each of the resulting compounds was placed on a glass plate at room temperature, and various inspections and tests were carried out at different intervals, the results obtained using the various recipes being shown in Table III.

cosity average molecular weight of about 1,250,000 (intrinsic viscosity of 4.1) were pressed into sheets 0.020 inch thickness which were cut into strips 0.5 inch wide. The strips of polymer were placed in a flask together with 50 grams of bromine and 100 milliliters of carbon tetrachloride. After flushing with nitrogen, the flask was heated under reflux for 6 hours and the carbon tetrachloride and unreacted bromine were distilled off. The reaction product was dissolved in toluene, precipitated in excess ethanol and dried under vacuum at 80° C. The product had a viscosity average molecular weight of 59,000 (intrinsic viscosity 0.41) and a bromine content of 3.1 percent by weight. These results showed that a suitable reaction product could be obtained by digesting the polyisobutylene in a bromine-carbon tetrachloride solution, whereby solution and degradation of the polymer are effected in a single operation.

Example VI

One hundred grams of a saturated polyisobutylene having a viscosity average molecular weight of about 2,150,000 (intrinsic viscosity 4.1) were banded on a cold two roll mill and twenty grams of N-N'-dibromo-5,5-dimethyl hydantoin were blended into the polymer.

A similar procedure was also carried out using instead the molecular equivalent of N-N'-dichloro-5,5 dimethyl hydantoin, namely 15.9 grams.

Each of the resulting mixtures was placed in a sepa-

TABLE III

| Compounding Ingredient | #1 | #2 | #3 | #4 | #5 | #6 | #7 | #8 | #9 |
|---|---|---|---|---|---|---|---|---|---|
| Reaction Product, grams | 100 | 100 | 100 | 100 | 100 | 100 | 100 | 100 | 100 |
| Polar 45,[1] grams | 100 | 100 | 100 | 100 | 100 | 100 | 100 | 100 | 100 |
| Buca Clay,[1] grams | 200 | | | | | | | | |
| Kaolite,[1] grams | | 300 | | | | | | | |
| Lithopone,[1] grams | | | 400 | | | | | | |
| McNamee Clay,[1] grams | | | | 270 | | | | | |
| Hi-Sil 233,[1] grams | | | | | 60 | | | | |
| P-33 Black,[1] grams | | | | | | 235 | | | |
| Suprex Clay,[1] grams | | | | | | | 215 | | |
| Nytal 400,[1] grams | | | | | | | | 215 | |
| Atomite,[1] grams | | | | | | | | | 400 |
| Titanox A-430,[1] grams | 25 | 25 | 25 | 25 | 25 | 25 | 25 | 25 | 25 |
| Triethylene tetramine, grams | 15 | 15 | 15 | 15 | 15 | 15 | 15 | 15 | 15 |
| Cold flow in uncured stock | No | Yes | Yes | No | No | No | No | No | No |
| Shore A₂ Hardness (instant reading after 16 days) | 20 | 15 | 20 | 23 | 13 | 32 | 18 | 16 | 25 |
| State of Cure,[2] Days at room temp.: | | | | | | | | | |
| 2 | W | W | W | W | W | S | W | S | S |
| 4 | S | S | S | S | S | S | S | S | S |
| 8 | C | S | C | C | S | C | S | C | C |
| 10 | C | C | C | C | C | C | C | C | C |

[1] Appendix of Compounding Ingredients:
 Polar 45—A petroleum oil with a specific gravity 60° F./60° F. of 0.88 and a viscosity of 350 Saybolt Universal Seconds at 80° F.
 Buca Clay—An aluminum silicate of specific gravity 2.5 with about 90% of the particles below 2 microns in size.
 Kaolite—A compounding clay.
 Lithopone—A mixture of 30% zinc sulphide and 70% barium sulphate.
 McNamee Clay—A soft hydrated aluminum silicate of which 99% will pass 300 mesh screen.
 Hi-Sil 233—A precipitated hydrated silica, containing about 84% SiO₂.
 P-33 Black—A fine thermal carbon black.
 Suprex Clay—A hard clay with a specific gravity of 2.6, 87-92% of which has a particle size less than 2 microns.
 Nytal 400—A talc with a specific gravity of 2.85, of which 90% will pass 325 mesh screen.
 Atomite—A calcium carbonate, having an average particle size of 2.5 micron.
 Titanox A-430—Titanium dioxide in the form of anatase.
[2] W=mixture still workable; S=set-up, stiff; C=cured, tough and elastic.

The compounds remained workable for at least 24 hours and, with the exception of samples #2 and #3, there was no evidence of cold flow. After vulcanization, the compounds exhibited tough elastic properties such as are required of modern caulking materials. The dimensional stability of the curved compound is attributed to the presence of terminal bromine atoms in the reaction product chains which atoms cause a network to be formed on reaction with triethylene tetramine. In the absence of this network, the cured compound would eventually fall or flow out of the position to which it had been applied.

Example V

Fifty grams of saturated polyisobutylene having a visrate glass jar having a loosely fitted screw cap and the jars were transferred to an oven for two hours at 300° F. The chlorinated reaction product was a tough millable rubber which, after homogenization on a mill, was found to have an intrinsic viscosity of 1.18, as determined by the method of Example II, this figure corresponding to a viscosity average molecular weight of 310,000. The brominated reaction product, on the other hand, was degraded to a viscous liquid having a viscosity average molecular weight of only 34,000.

The above results show that the degradation of polyisobutylene by chlorination was not nearly so efficient as by bromination.

Example VII

A copolymer of isobutylene and styrene containing a minor proportion of the latter comonomer was prepared using the following charge recipe:

| | Parts |
|---|---|
| Methyl chloride | 3750 |
| Isobutylene | 1250 |
| Styrene | 12.5 |
| Aluminium trichloride (in 100 ml. of methyl chloride) | 0.33 |

Thirty millilitres of the aluminium trichloride catalyst were added to the mixture of monomers over a period of one minute. Polymerization was conducted at −150° F. after which the reaction was stopped by the injection of an excess of ethanol. The resulting copolymer had a viscosity average molecular weight of about 5,000,000 (intrinsic viscosity in diisobutylene of 6.85) and a yield of 48 parts was obtained, the presence of combined styrene being proved by infra-red analysis.

6.24 parts of the copolymer was cut into small pieces and placed in a 16 millimetre glass tube having a length of 10 inches. A solution of 1 millilitre of bromine (3.12 parts) in 6.24 millilitres of carbon tetrachloride was added and the tube sealed. The tube was then heated in an oil bath for one hour at 120° C. and the resultant solution was diluted with 50 millilitres of pentane. Fifty millilitres of ethanol were added to precipitate the polymer which was subsequently dried under vacuum at 80° C.

The product was a semi-liquid having a viscosity average molecular weight of 15,000 (intrinsic viscosity in toluene of 0.19) and containing 5.7% by weight of bromine.

Tetraethylene pentamine (0.1 part) and Atomite (0.3 part) were premixed before being incorporated into 1 part of the brominated reaction product. The resulting composition cured to an elastic rubber on standing overnight at room temperature.

I claim:
1. A process of producing a vulcanizable reaction product which comprises reacting a substantially saturated iso-monoolefin polymer of high molecular weight with a brominating agent at an elevated temperature for a sufficient time such that a brominated reaction product is obtained composed of chains of degraded polymer of which a major proportion possess terminal bromine atoms, said reaction product having a viscosity average molecular weight not greater than twenty percent that of the unbrominated polymer.
2. A process according to claim 1 in which the reaction is carried out at a temperature of at least 75° C. and in the presence of at least 5% of bromine by weight of iso-monoolefin polymer.
3. A process according to claim 2 in which the bromine is present in an amount of from 10 to 120% by weight of the iso-monoolefin polymer.
4. A process according to claim 1 in which the iso-monoolefin polymer is a homopolymer of isobutylene.
5. A process according to claim 1 in which the iso-monoolefin polymer is a copolymer of isobutylene and an unsaturated aromatic hydrocarbon.
6. A process according to claim 1 wherein said saturated iso-monoolefin polymer has a viscosity average molecular weight of from 200,000 to 5 million and is selected from homopolymers of isobutylene and copolymers of isobutylene and styrene, said temperature is between 110° and 150° C. and said reaction product has a viscosity average molecular weight of from 0.3 to 10% that of the unbrominated polymer.
7. A process according to claim 1 which includes the step of vulcanizing the brominated reaction product.
8. The process according to claim 7 in which the reaction product is vulcanized in the presence of a polyfunctional amine.
9. A process according to claim 8 wherein said polyfunctional amine is selected from triethylene tetramine, tetraethylene pentamine and hexamethylene diamine.
10. A vulcanizable reaction product formed by the process of claim 1.
11. A vulcanized product formed by the process of claim 7, and having an insolubility of at least 50% by weight in cyclohexane at 25° C.
12. A vulcanized product formed by the process of claim 8, and having an insolubility of from 75 to 98% by weight in cyclohexane at 25° C.

References Cited
UNITED STATES PATENTS 3,033,838    5/1962    Ray.

JOSEPH L. SCHOFER, *Primary Examiner.*

L. EDELMAN, *Assistant Examiner.*